Aug. 15, 1944.   H. E. EDWARDS   2,356,038
MACHINE FOR CUTTING RINGS FROM CYLINDRICAL TUBING
Filed Nov. 14, 1941   6 Sheets-Sheet 1

Inventor.
Herbert E. Edwards
By Charles W. McDermott
his Atty.

Aug. 15, 1944.   H. E. EDWARDS   2,356,038
MACHINE FOR CUTTING RINGS FROM CYLINDRICAL TUBING
Filed Nov. 14, 1941   6 Sheets-Sheet 4

Patented Aug. 15, 1944

2,356,038

UNITED STATES PATENT OFFICE 2,356,038

MACHINE FOR CUTTING RINGS FROM CYLINDRICAL TUBING

Herbert E. Edwards, Wellesley, Mass.

Application November 14, 1941, Serial No. 419,044

10 Claims. (Cl. 29—70)

The present invention relates to machines for cutting rings from cylindrical tubing.

In the munition field it is customary to encompass every shell by what is known as a rotating band. The bands are rings made from bronze seamless tubing which vary in diameter from twenty millimeters to sixteen inches. The walls of the tube vary in thickness and the width of the ring varies also. The brass mills have expanded rapidly their production in seamless tubing, but heretofore have been unable to expand correspondingly their equipment for cutting rings from the tubing. The present practice is to supply a given length of tubing to the cutting-off machine, said tubing being projected in a stationary manner beyond the edge of a work support to a distance which permits a circular saw to pass by the end of the work support and through the full diameter of the stationary tube. There are at least three objections to this method.

First, as the cutting nears completion, the power exerted by the circular saw against the stationary tubing becomes greater than the opposing strength of the unsawed tubing. In actual practice the ring being sawed gives way or bends in the final cutting. This bending is reflected in a burr or fin left on the cut ring as it drops from the tubing. The fin must be removed by a burring operation performed by hand or otherwise.

Second, the diameter of the cutting saw is governed by the diameter of the tubing. Actually, it is found that it would be impracticable to cut a four inch tube with a saw of less than ten inches in diameter. As the diameter of the cutting saw increases the width of the cutting edge must be increased to provide the rigidity in the saw for precision cutting. In actual practice it is found that as the width of the cutting edge increases, the wastage in the cutting operation also increases, which becomes an important factor when the rings are cut from valuable or scarce materials.

Third, regardless of the diameter of a saw in cutting through a tube which is rigidly supported when presented to it, the flexibility necessary to make a saw practical and the normal play in the various parts of the machine is reflected in a relative degree in a lack of precision in the ring cut from the tube.

The principal object of the present invention is to produce a machine for cutting rings from cylindrical tubing which will obviate at least the three objections referred to.

In the accomplishment of this object, and such others as may be hereinafter described, the features of the present invention relate to certain devices and combinations and arrangement of parts hereinafter described and set forth broadly and in detail in the appended claims which possess advantages readily apparent to those skilled in the art.

The various features of the present invention will be readily understood from an inspection of the accompanying drawings illustrating the best form of the invention at present known to the inventor, in which, Figure 1 is a view in plan of the machine, the cover having been removed;

Fig. 9 (Sheet 1) is a detail view, (broken away), in sectional elevation on the line 9—9, Fig. 1;

Fig. 10 (Sheet 2) is a detail view in front elevation showing the operation of the tube and the cutters, and Fig. 11 (Sheet 5) is a view in front sectional elevation on the line 11—11, Fig. 1, of the work support and the tube guiding finger.

Figure 1:
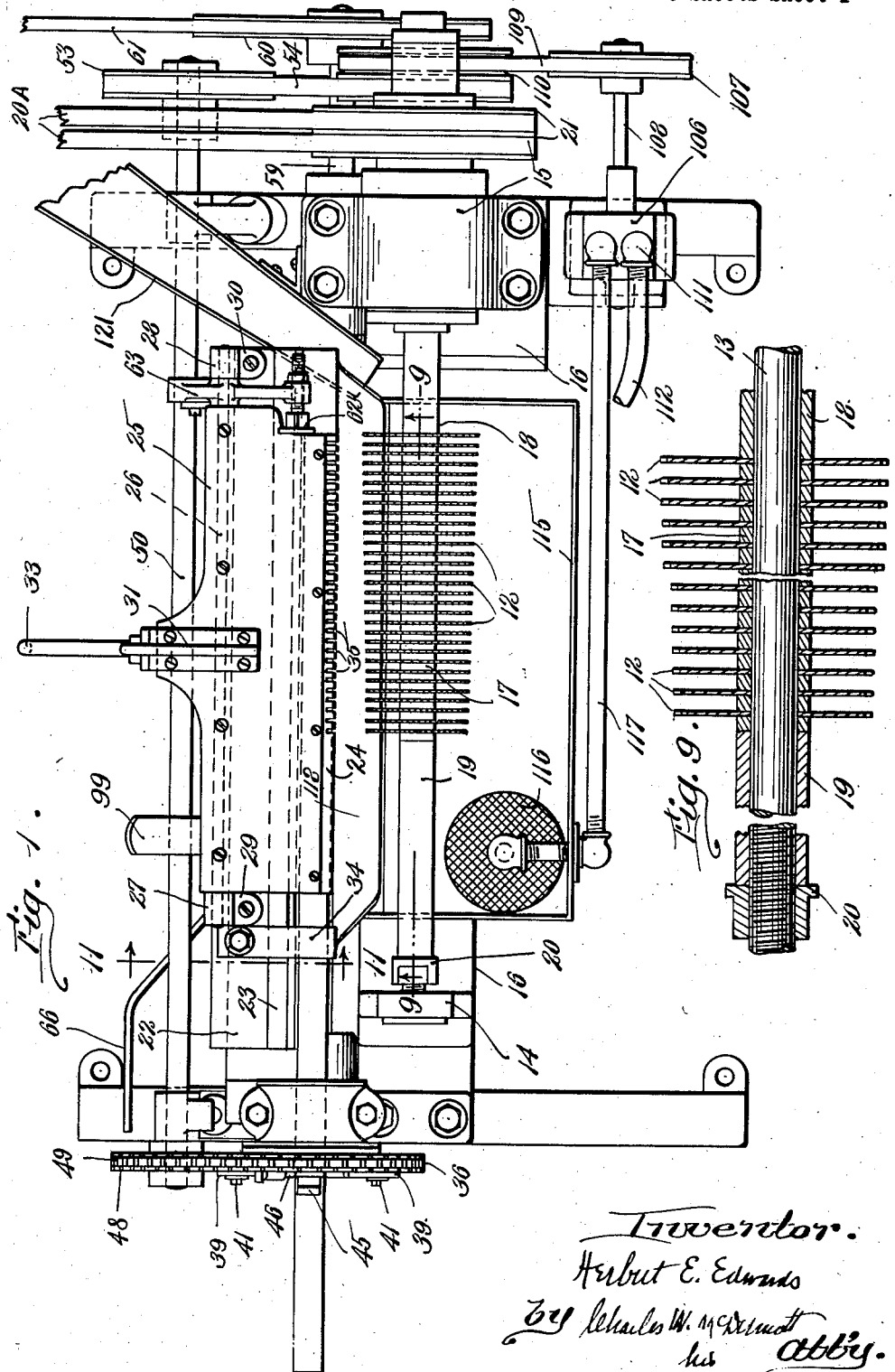

The cutting tool, Figs. 1 and 9, comprises a series of thirty-one saws 12 each mounted on a shaft 13 journaled in bearings 14 and 15 on the frame 16 of the machine. Each saw 12 differs in diameter from every other saw in the series, the series varying in diameter successively from the left, Fig. 1 to the right thereof, the smallest saw located at the left Fig. 1 and the largest saw at the right. The saws are spaced by a washer 17 the width of the ring to be cut. In assembling the cutting tool on the shaft 13 the saw 12 having the largest diameter is placed on the shaft 13 against an elongated collar 18 thereon. After inserting a washer 17 on the shaft 13 to the left, Figs. 1 and 9, of the previously positioned saw 12, the largest of the remaining saws is positioned against the washer 17 on the shaft 13. After another washer 17 is positioned on the shaft 13 against the second saw in the series the remaining saws and the spacing members are positioned as previously described, until the thirty-one saws and the thirty-one washers are located on the shaft 13. The cutting tool is held rigid in position on the shaft 13 by an elongated collar 19 which is held on the shaft by a nut 20 on the threaded end thereof. Pressure on the nut 20 clamps the collar 19, the cutting tool and the collar 18 rigidly on the shaft 13. The shaft is rotated in a clock-wise direction (Fig. 3), from some suitable source of power through a double belt 20A (Fig. 1), which passes over two pulleys 21 on the shaft 13.

Figure 5:
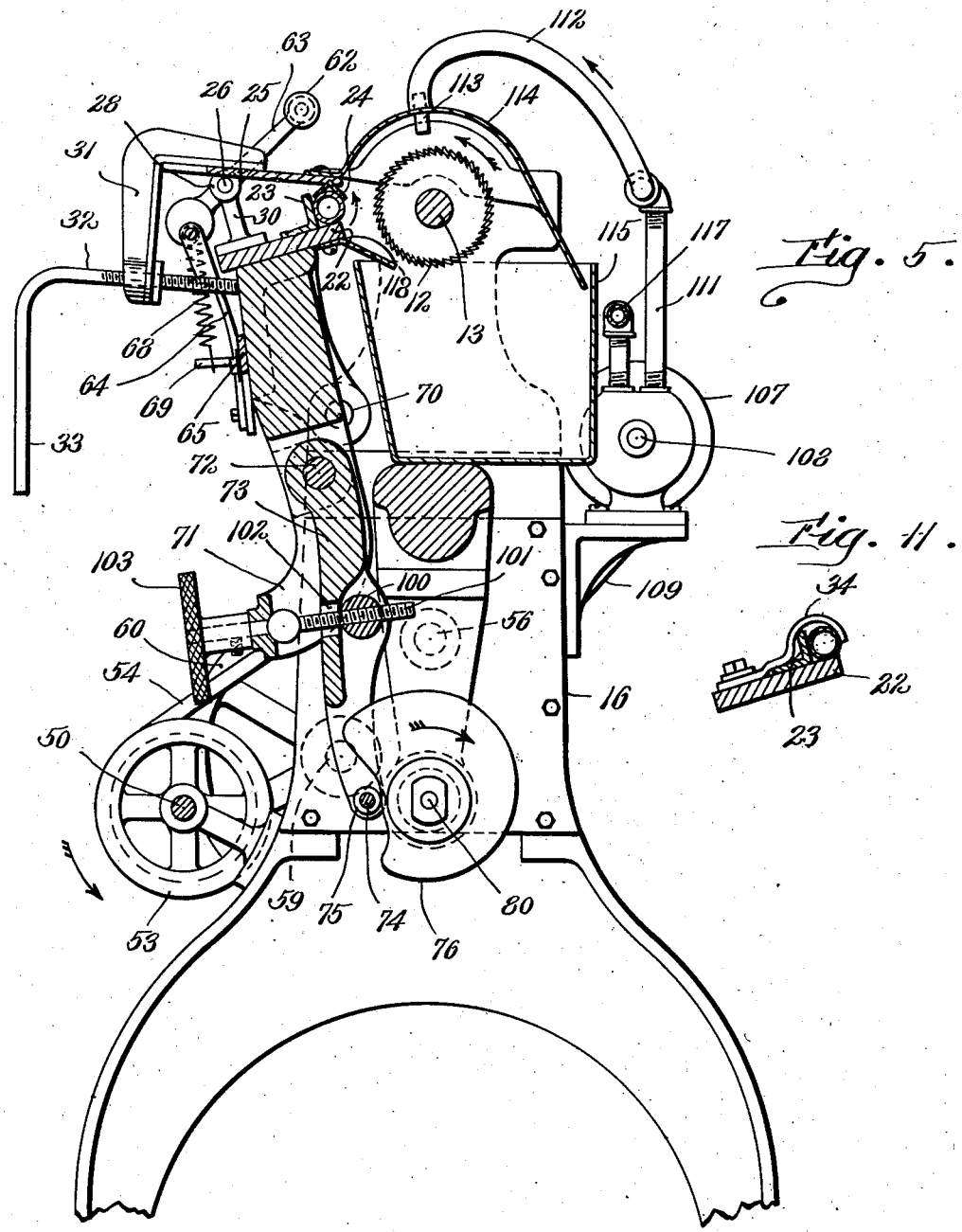
Fig. 5 is a view in sectional elevation on the line 5—5, Fig. 4.

The tubing, to be cut, is positioned on a work support having a flat work supporting surface 22 (Fig. 5), against an angle iron 23 secured thereto. The tube is held on the work support against the angle iron during the cutting operation, by an elongated clamp 24 comprising an inverted V the arms of which are arranged to press upon the tube. The V is secured to a plate 25 secured to a rock shaft 26 (Figs. 1 and 5), journaled in bearings 27 and 28 on brackets 29 and 30, secured to the work support 22. The plate 25 is provided with an angular member 31 (Fig. 5), through the free end of which is threaded a rod 32 which may be manipulated through the handle 33 to engage the vertical wall of the work support and thus actuate the clamp 24 to grip the tubing. At the left hand end of the work support 22 (Fig. 1), the tubing is guided by the engagement with a curved piece or finger of flat material 34 (Fig. 11), which extends over the angle iron 23 from its position of attachment to the work support. As shown in Fig. 1, the right hand wall of the clamp 24 is provided with thirty slots 35 which are arranged in the vertical planes of the respective saws except the largest. This saw, which is the first saw at the right (Fig. 1), is not used for sawing, but as it extends beyond the clamp 24 with its inner face substantially in the plane of the face of the stop 62 (Fig. 1), is employed as a guard to hold the first ring in position after being cut.

Figure 2:
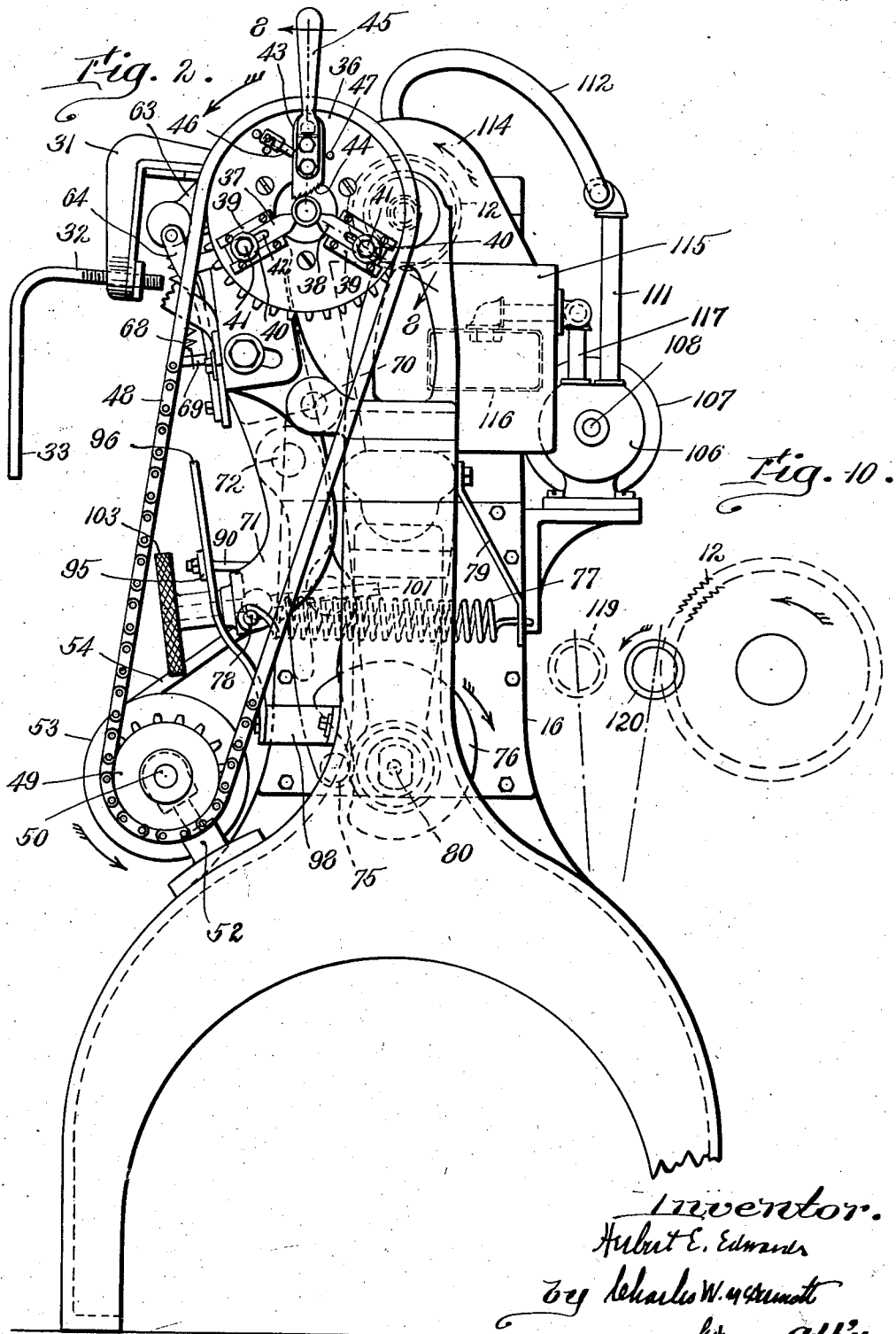
Fig. 2 is a view in front elevation, the cover having been replaced.
Figure 8:
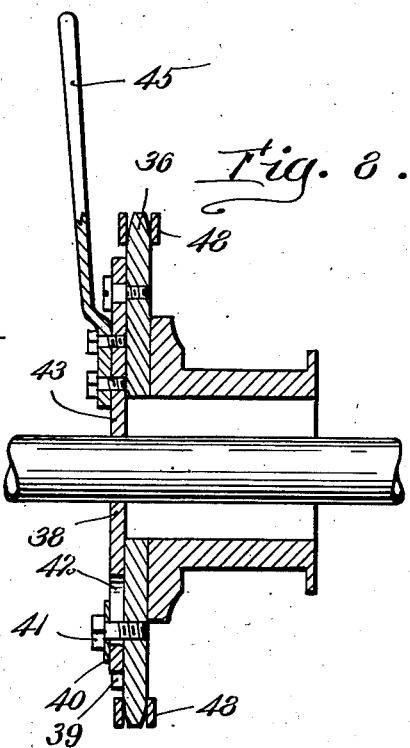
Fig. 8 is a detail view in sectional elevation on the line 8—8, Fig. 2.

The tubing is positioned on the work support 22 through a central opening (Fig. 2), in a sprocket wheel 36 journaled on the work support. On one face of the sprocket wheel 36 are two adjustable fingers 37 and 38. Each finger slides in ways 39 secured to the face of the sprocket wheel and is secured in its adjusted position by a washer 40 (Fig. 8), interposed between the finger and a nut 41 the shank of which passes through a central slot 42 in the finger and is threaded onto the sprocket wheel. After the tubing is positioned on the work support by its engagement with the fingers 37 and 38 it is clamped thereon by a third finger 43 which is pivoted on the sprocket wheel. The finger 43 is provided with a series of inclined teeth 44 (Fig. 2). The finger 43 is provided with an operating arm 45. The finger 43 is engaged on one side by a spring pressed plunger 46 carried by the sprocket wheel to press the finger against a stop 47 on the sprocket wheel. When anchored to the sprocket wheel the tubing is rotated on the work support while it is engaged by the clamp 24 (Fig. 5) which, however, does not rotate.

Figure 6:
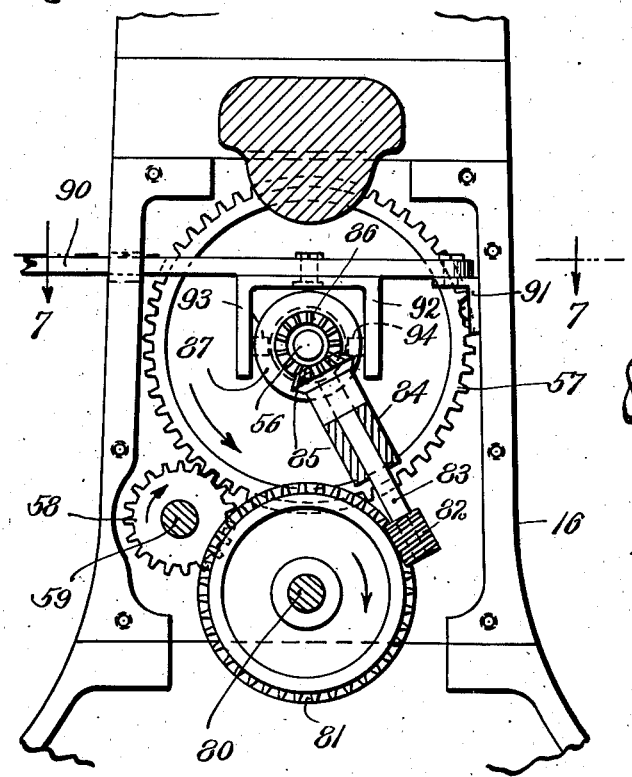
Fig. 6 is a detail view in sectional elevation on the line 6—6, Fig. 4.
Figure 7:
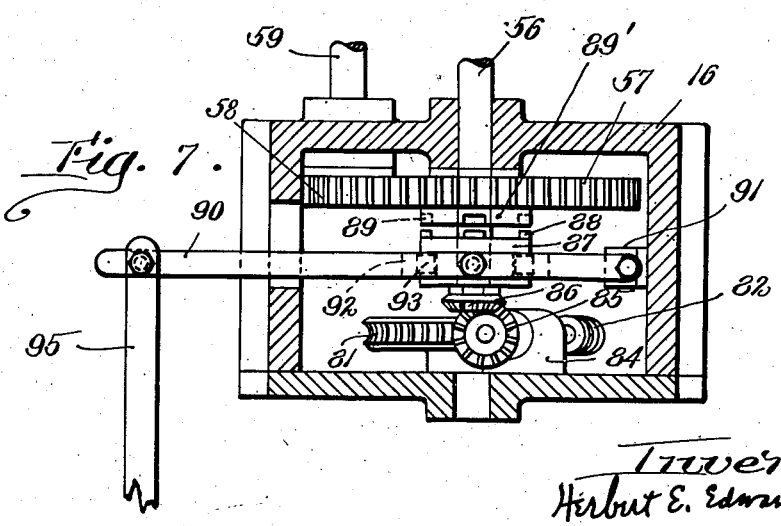
Fig. 7 is a detail view in sectional plan on the line 7—7, Fig. 6.

The sprocket wheel 36 (Fig. 2) is engaged by a chain 48 which is rotated by a sprocket wheel 49 on a shaft 50 (Fig. 4), journaled on bearings 51 and 52 carried from the machine frame. The shaft 50 is provided with a pulley 53 about which a belt 54 passes which also passes around a pulley 55 secured to a rock shaft 56 journaled on the machine frame. The shaft 56 carries loosely a large gear 57 (Figs. 6 and 7) which is driven by a small gear 58 mounted on end of a stub shaft 59 journaled on the machine frame. The other end of the shaft 59 carries a pulley 60 (Fig. 3), which is rotated by a belt 61 driven by some suitable source of power.

The tubing is positioned on the work support 22 against an adjustable stop 62 (Fig. 1). The stop 62 is adjustably mounted on one end of a bell crank lever 63 which is loosely mounted on the rock shaft 26 between the right hand end of the plate 25, viewing Fig. 1, and the bearing 28 for the shaft 26. The other end of the bell crank lever 63 is pivoted to one end of a link 64 (Fig. 4), the other end of which is pivoted to one end of an arm 65 pivoted to the work support 22. The other end of the arm 65 is shaped as an opening handle 66. The bell crank lever 63 is provided with pin 67 to which one end of a coiled spring 68 is connected, the other end of the spring being connected to a pin 69 projecting from the work support.

The work support 22 (Fig. 4) is provided with a pair of pins 70 each of which is mounted to rock in the frame of the machine. The work support 22 has a depending slotted arm 71 which carries a pin 72 to which an arm 73 (Fig. 5) is pivoted. The lower end of the arm 73 is slotted and carries a pin 74 on which a roll 75 is held against the periphery of a cam 76 by a coiled spring 77 (Figs. 2 and 4) one end of which is connected to a pin 78, projecting laterally from the arm 71 depending from the work support 22, and the other end of which is connected to a plate 79 depending from the frame of the machine.

The cam 76 is mounted on a short horizontal shaft 80 journaled on a bracket depending from the machine frame. At its left hand end, Figs. 6 and 7, the shaft 80 carries a worm wheel 81 which is driven by a worm 82 on one end of a shaft 83 journaled in a bearing 84 on the machine frame. The other end of the shaft 83 carries a gear 85 which engages a gear 86 on the shaft 56.

The shaft 56 carries a clutch sleeve 87 (Fig. 7) which is splined on the shaft and is provided with clutch lugs 88 to engage clutch depressions 89 formed on a collar 89' secured to the large gear 57. The sleeve may be slid along the shaft 56 to engage the clutch lugs 88 with the clutch depressions 89 by an arm 90 pivoted on a bracket 91 secured to the machine frame. Secured to the arm 90 is a forked arm 92 having two blocks 93 and 94 arranged to engage respectively, two depressions on opposite sides of the clutch sleeve 87.

The free end of the arm 90 is pivoted to one end of a link 95 the other end of which is pivoted to an arm 96 which is pivoted to a strap 97 supported by bracket 98 secured to the machine frame. The free end of the arm 96 is shaped as an operating handle 99 for the operative to engage and disengage the clutch.

The normal position of the roll 75 may be moved toward or from the periphery of the cam 76 to vary the time when the cam starts to move the tubing towards the cutter. To this end the slotted end of the arm 73 is provided with a rotatable stud 100 (Fig. 5), through which passes the threaded portion of a rod 101. The rod 101 passes through an opening 102 formed in the arm 73 and is connected with a head 103 rotatably mounted on the depending arm 71 of the work support.

Figure 3:
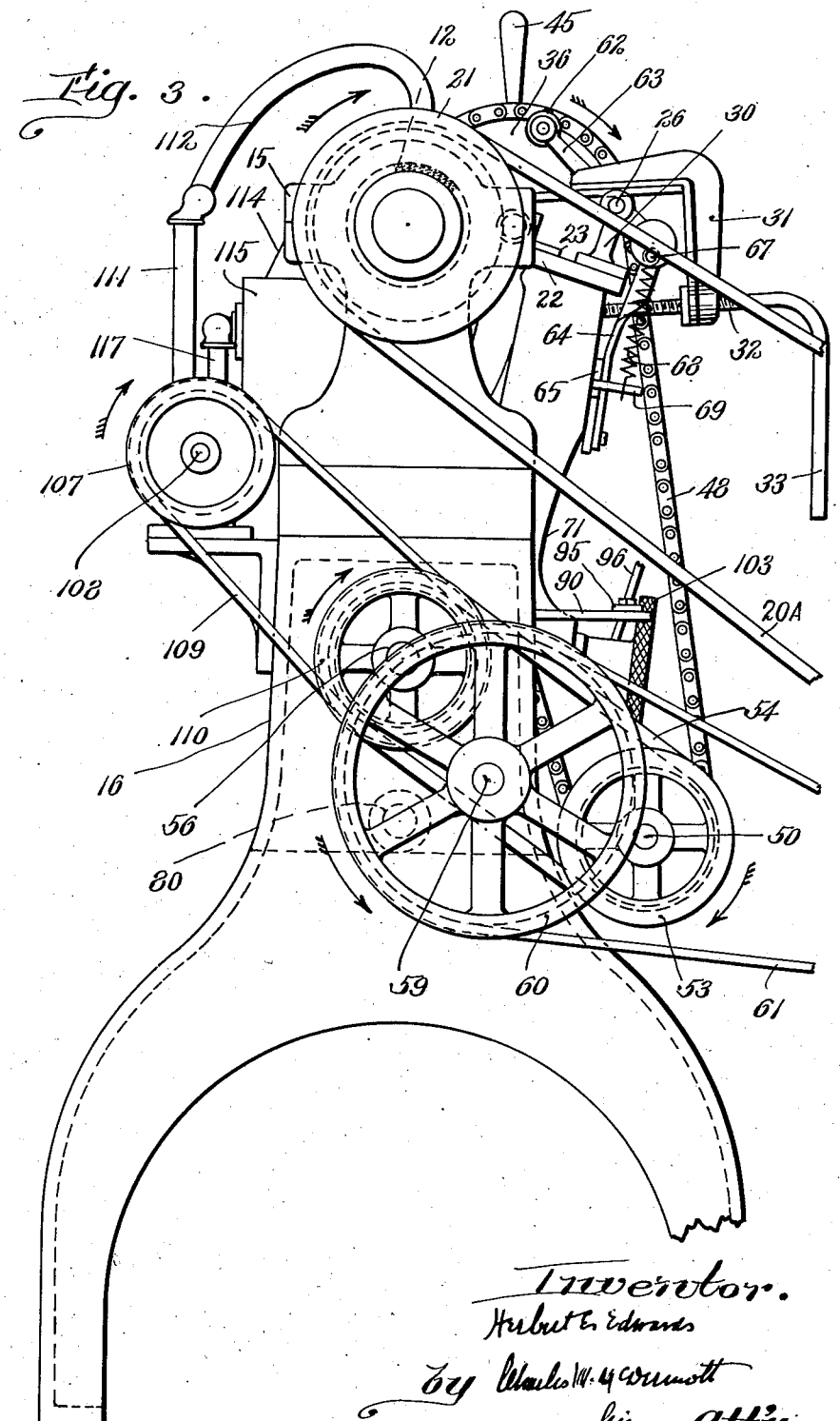
Fig. 3 is a view in back elevation.
Figure 4:
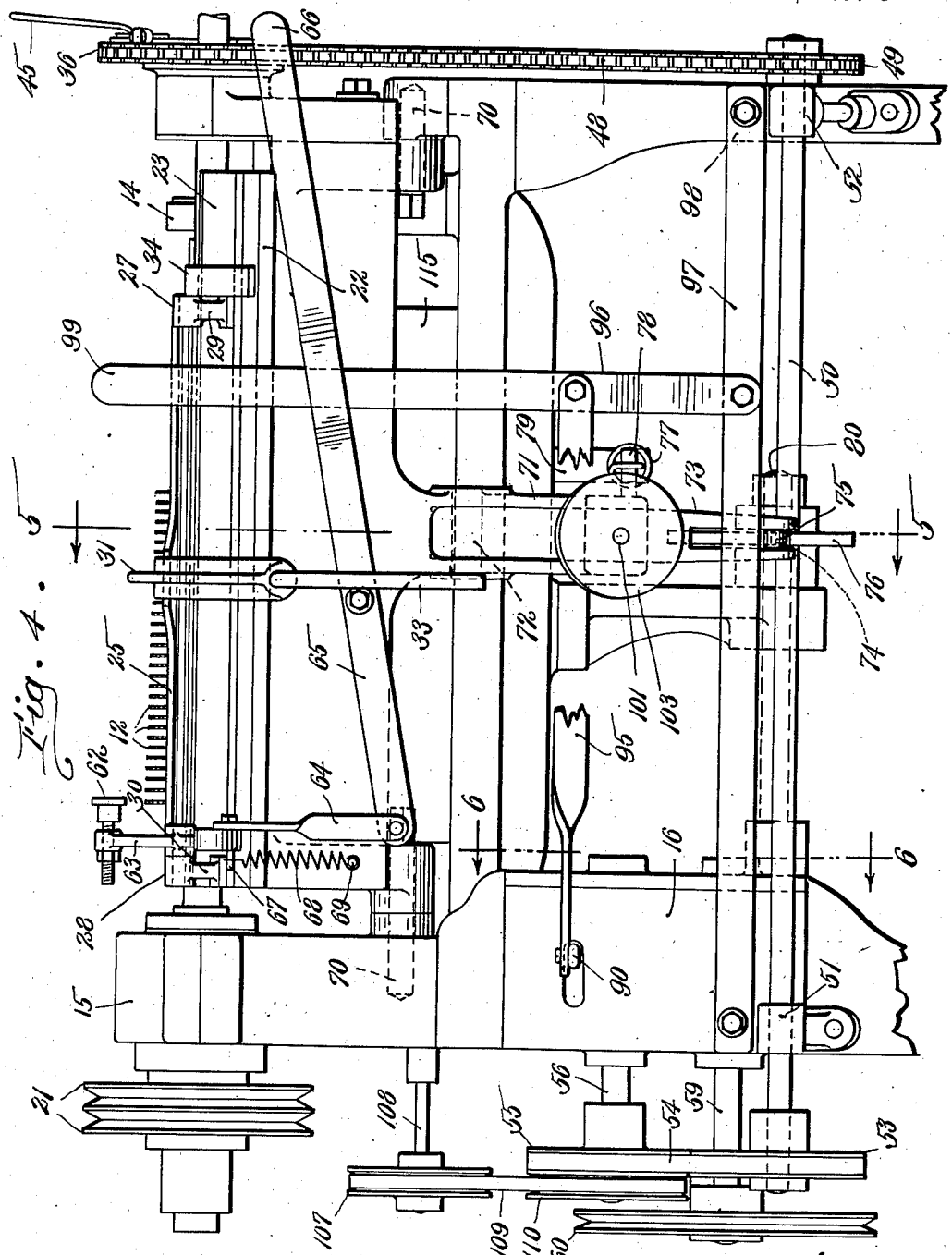
Fig. 4 is a view in left side elevation.

To provide lubrication at the cutting points, a rotary pump 106 (Fig. 2) is mounted on the machine frame, which is driven by a pulley 107 on the pump shaft 108 (Fig. 3). The pulley 107 is driven by a belt 109 from a pulley 110 which is secured to the shaft 56. The pump 106 discharges lubricant out of the pipe 111 to the free end of which a flexible hose 112 is connected. The free end of the hose 112 is provided with a plug 113 by which the hose 112 is directed to discharge the lubrication through a cover 114 secured at one end to the elongated clamp 25, the other end of the cover working loosely in a tank 115 secured to the frame of the machine. The tank 115 carries a small screened receptacle 116 from which the lubricant is drawn through the pipe connection 117 connected to the pump. The work support 22 carries a splash guard 118 (Figs. 1 and 5) which directs the lubricant into the tank 115.

In operation, the elongated cylindrical tubing is pushed through the opening in the sprocket wheel 36, with its end beneath the finger 34, on the work support 22 until its front end engages the stop 62 which has been manipulated into stopping position by the operative. The clamp 24 is then actuated to grip the tubing on the work support. The operating arm 45 is then manipulated to anchor the tubing to its rotating mechanism. The stop 62 is then moved out of engagement with the tubing. The machine is then thrown into operation to rotate the cutters. The clutch sleeve 87 (Fig. 7) is then thrown into operation to rotate the tubing and the cam 76. The rotating tubing is moved by the slower rotating cam 76 from the position 119 (Fig. 10), to the position 120 thereon. The tubing is engaged successively by the cutters, first endwise by the largest saw 12 and last by the smallest saw 12. The ring cut from the tubing by the next to largest saw leaves the rotating tube, but is held in position by engagement between the first and second saws at the right of Figs. 1 and 9. The second ring, cut from the tubing by the third largest saw, leaves the rotating tube, but is held in position by engagement with the second and third saw at the right of Figs. 1 and 9. This action takes place successively until all the rings are severed from the tubing. At this time the roll 75 has been moved to the position of Fig. 2 which indicates the cutting operation has been completed. The clutch sleeve 87 is then actuated to stop the rotation of the tubing and the cam 76, and the clamp 24 is actuated to release the tubing on the work support. The tubing is then unclamped from the sprocket wheel 36 and is pushed forwardly. The thirty rings severed from the tube are thus pushed forwardly to discharge them down a runway 121, Fig. 1.

The illustrated embodiment of the present invention is described as being provided with a shaft for the cutting tool mounted parallel to the rotating tube. This is to be considered as the preferred mode of operation as it is obvious the rotating tube and the shaft for the cutting tool may rotate about non-parallel axes, provided the operating tool is made up of saws uniform in diameter.

Nothing herein explained is to be interpreted as limiting the various features of the present invention in the scope of its application to use in connection with the particular mode of operation or the particular machine or any combination thereof selected for purposes of illustration and explanation. While the particulars of the construction herein set forth are well suited to one mechanical form of the invention and to the use to which it is put, the invention is not limited as to these details of construction, nor to the conjoint use of its features, nor is it to be understood that these particulars are essential since they may be modified within the skill of the artisan without departing from the true scope of the actual invention, characterizing features of which are set forth in the following claims by the intentional use of generic terms and expressions inclusive of various modifications.

What is claimed as new is:

1. A machine for cutting rings from cylindrical tubing having, in combination, a rotatable cutting tool comprising a plurality of saws, means for rotating the tool, a flat work supporting surface, a clamp for loosely clamping a length of tubing on the work supporting surface, said clamp being provided with slots into which the peripheries of the respective saws may pass freely in cutting the rings from the cylindrical tubing, means for rotating the length of tubing relatively to the supporting surface, and means for relatively moving the rotating tool and the rotating tubing to cause the plurality of saws to cut rings from the cylindrical tubing.

2. A machine for cutting rings from cylindrical tubing having, in combination, a rotatable cutting tool comprising a plurality of saws, means for rotating the tool, a flat work supporting surface, a clamp for loosely clamping a length of tubing on the work supporting surface, said clamp being provided with slots into which the peripheries of the respective saws may pass freely in cutting the rings from the cylindrical tubing, means for rotating the length of tubing, and means for holding against movement axially of the tubing at least one of the rings cut from the tubing by the saws during the continued rotation of the tubing.

3. A machine for cutting rings from cylindrical tubing having, in combination, a rotatable cutting tool comprising a plurality of saws, means for rotating the tool, a flat work supporting surface, a clamp for loosely clamping a length of tubing on the work supporting surface, said clamp being provided with slots into which the peripheries of the respective saws may pass freely in cutting the rings from the cylindrical tubing, means for rotating the tubing on the work supporting surface beneath the clamp, and means for relatively moving the rotating tool and the rotating tubing to bring the operating tool into contact with the rotating tubing and for passing the operating tool through the tubing while it is loosely clamped on the work supporting surface.

4. A machine for cutting rings from cylindrical tubing having, in combination, a rotatable cutting tool comprising a plurality of saws, means for rotating the tool, a flat work supporting surface, a clamp for loosely clamping a length of tubing on the work supporting surface, said clamp having fingers, being spaced no wider than the rings to be cut from the cylindrical tubing, means for rotating the length of tubing, and means for relatively moving the rotating tool and the work to cause the operating tool to pass through the work and into the spaces between the fingers to cut rings from the cylindrical tubing.

5. A machine for cutting rings from cylindrical tubing having, in combination, a rotatable cutting tool comprising a series of saws graduated in size from large to small, means for rotating the tool, a work support, a clamp for loosely clamping a length of tubing on the work support, said clamp being provided with slots into which the peripheries of the respective saws may pass freely in cutting the rings from the cylindrical tubing, means for rotating the length of tubing, and means for relatively moving the rotating tool and the rotating tubing to bring the plurality of saws into working contact with the rotating tubing, whereby the saws successively sever rings from the tubing, the smallest saw in the series severing a ring from the tubing last.

6. A machine for cutting rings from cylindrical tubing having, in combination, a rotatable cutting tool, means for rotating the tool, a flat work supporting surface, a clamp for loosely clamping a length of tubing on the flat work supporting surface, means for rotating the tubing, means for relatively moving the cutting tool and the rotating tubing to bring the cutting tool into working contact with the rotating tubing while it is loosely clamped on the flat work supporting surface, and rotary means coming into engagement with one end of the tubing for holding the material cut from the tubing in place upon the work supporting surface.

7. A machine for cutting rings from cylindrical tubing having, in combination, a rotatable cutting tool, means for rotating the tool, a work support, a clamp for loosely clamping a length of tubing on the work support, means for rotating the tubing, means for bringing the cutting tool into working contact with the rotating tubing, a stop for locating the tubing in position, and rotary means coming into engagement with one end of the tubing for holding the material cut from the tubing in place upon the work support.

8. A machine for cutting rings from cylindrical tubing having, in combination, a rotatable cutting tool comprising a plurality of saws, means for rotating the tool, a work support having a flat work supporting surface, mechanism for rotating a length of tubing relatively to the work supporting surface, a single clamp for clamping the tubing to the mechanism, a second clamp interposed between the first clamp and an end of the tubing for clamping loosely the length of tubing on the work supporting surface, said second clamp being provided with slots into which the peripheries of the respective saws may pass freely in cutting the rings from the cylindrical tubing, and means for relatively moving the rotating tool and the rotating tubing to cause the plurality of saws to cut rings from the cylindrical tubing.

9. A machine for cutting rings from cylindrical tubing having, in combination, a rotatable cutting tool comprising a plurality of saws, means for rotating the tool, mechanism for rotating a length of tubing, a single clamp for clamping the tubing to the mechanism, a work support having a flat work supporting surface, a second clamp interposed between the first clamp and one end of the tubing for clamping loosely the length of tubing on the work supporting surface, said second clamp being provided with slots into which the peripheries of the respective saws may pass freely in cutting the rings from the cylindrical tubing, means for moving the rotating tubing toward the rotating tool to cause the plurality of saws to cut rings from the cylindrical tubing, two of the saws adjacent the said end of the tubing retarding the rotation of a ring cut from the tubing during its continued rotation in contact with the remaining saws.

10. A machine for cutting rings from cylindrical tubing having, in combination, a rotatable cutting tool comprising a plurality of saws, means for rotating the tool, mechanism for rotating a length of tubing, a single clamp for clamping the tubing to the mechanism, a work support having a flat work supporting surface, a second clamp interposed between the first clamp and one end of the tubing for clamping loosely the length of tubing on the work supporting surface, said second clamp being provided with slots into which the peripheries of the respective saws may pass freely in cutting the rings from the cylindrical tubing, means for moving the rotating tubing toward the rotating tool to cause the plurality of saws to cut rings from the cylindrical tubing, each pair of saws progressively from the said end of the tubing frictionally arresting the rotation of a ring cut from the tubing during its continued rotation with the remaining saws.

HERBERT E. EDWARDS.